United States Patent [19]

Jackson, III

[11] Patent Number: 4,692,060
[45] Date of Patent: Sep. 8, 1987

[54] WATER-BAG DAM OR DIKE AND METHOD

[76] Inventor: James G. Jackson, III, 424 Douglas Ave., Kalamazoo, Mich. 49007

[21] Appl. No.: 882,081

[22] Filed: Jul. 3, 1986

[51] Int. Cl.$^4$ .......................... E02B 7/20; E02B 7/50; E01F 7/00
[52] U.S. Cl. ..................................... 405/115; 405/91; 256/13; 52/2
[58] Field of Search .................. 405/91, 107, 110, 111, 405/112, 113, 114, 115, 116, 90; 49/10, 362; 256/13, 19, 73; 52/2, 63

[56] References Cited

U.S. PATENT DOCUMENTS

| | | | |
|---|---|---|---|
| 3,213,628 | 10/1965 | Serota | 405/111 |
| 3,611,648 | 10/1971 | Barnett | 52/2 |
| 3,855,800 | 12/1974 | Ganzinotti | 405/91 |
| 4,136,995 | 1/1979 | Fish | 405/115 |
| 4,304,084 | 12/1981 | Moreland | 52/2 |
| 4,330,224 | 5/1982 | Muramatsu et al. | 405/115 |
| 4,362,433 | 12/1982 | Wagner et al. | 405/107 |
| 4,498,810 | 2/1985 | Muramatsu et al. | 405/115 |
| 4,607,655 | 8/1986 | Wagner et al. | 52/2 |

FOREIGN PATENT DOCUMENTS

| | | | |
|---|---|---|---|
| 519329 | 3/1955 | Italy | 52/2 |
| 526687 | 7/1957 | Italy | 52/2 |

Primary Examiner—Cornelius J. Husar
Assistant Examiner—Todd G. Williams
Attorney, Agent, or Firm—Gordon W. Hueschen

[57] ABSTRACT

A water-bag dam or dike comprises elongate tubes adapted to be filled with water. The tubes have three equal sides and are supported by longitudinal and lateral support members so that, when filled with water, they assume the shape of a substantially equilateral, triangular prism. The tubes can be stacked to make a dam or dike twice as tall and wide on the individual tubes. The tubes and support members can be transported to a flood situs and there be erected into an effective dam or dike just by filling the tubes with water.

18 Claims, 9 Drawing Figures

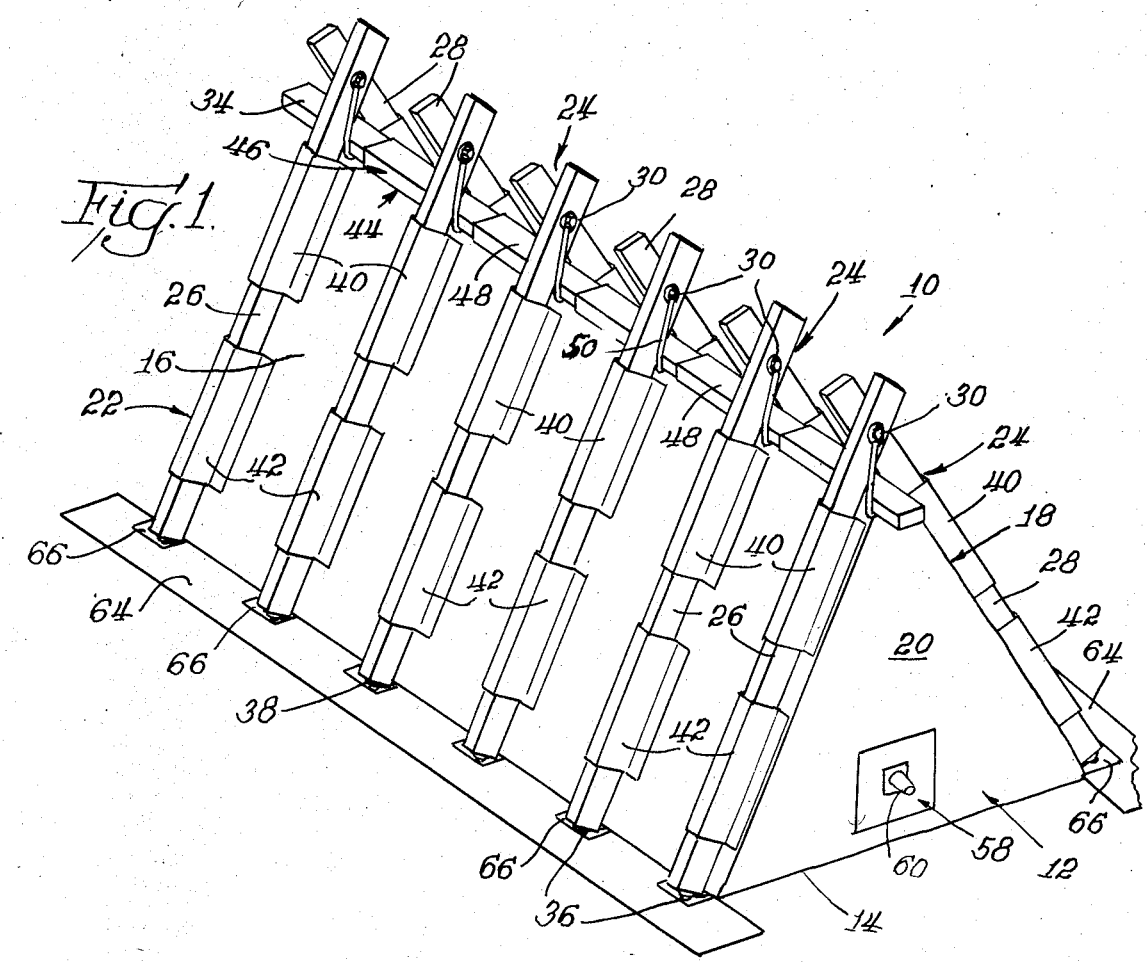
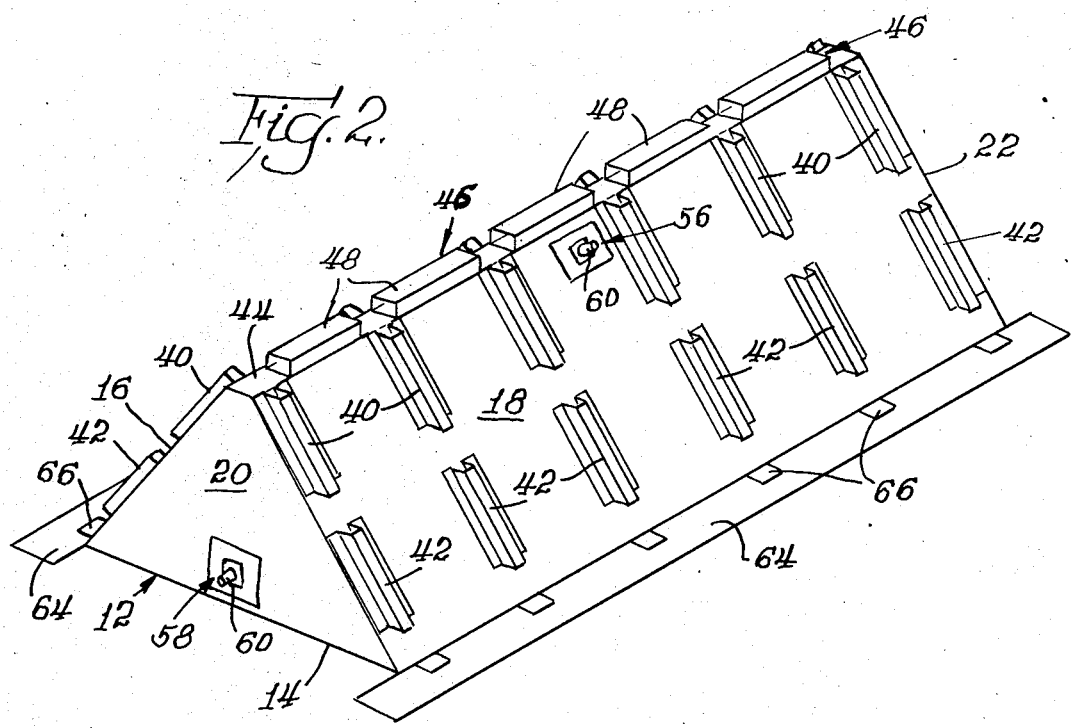

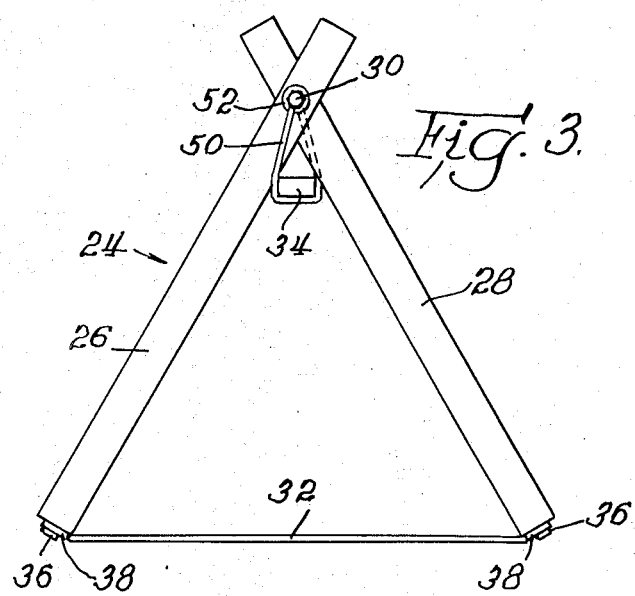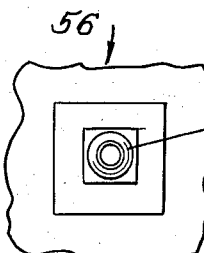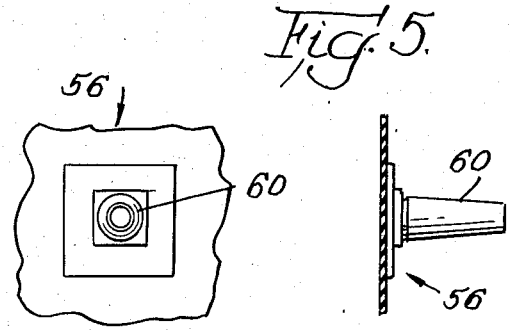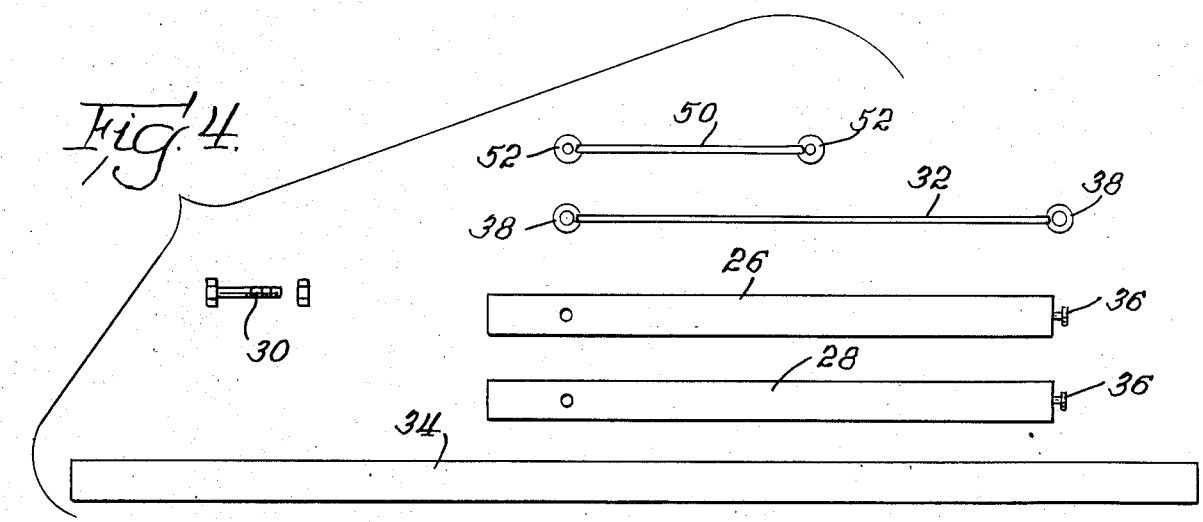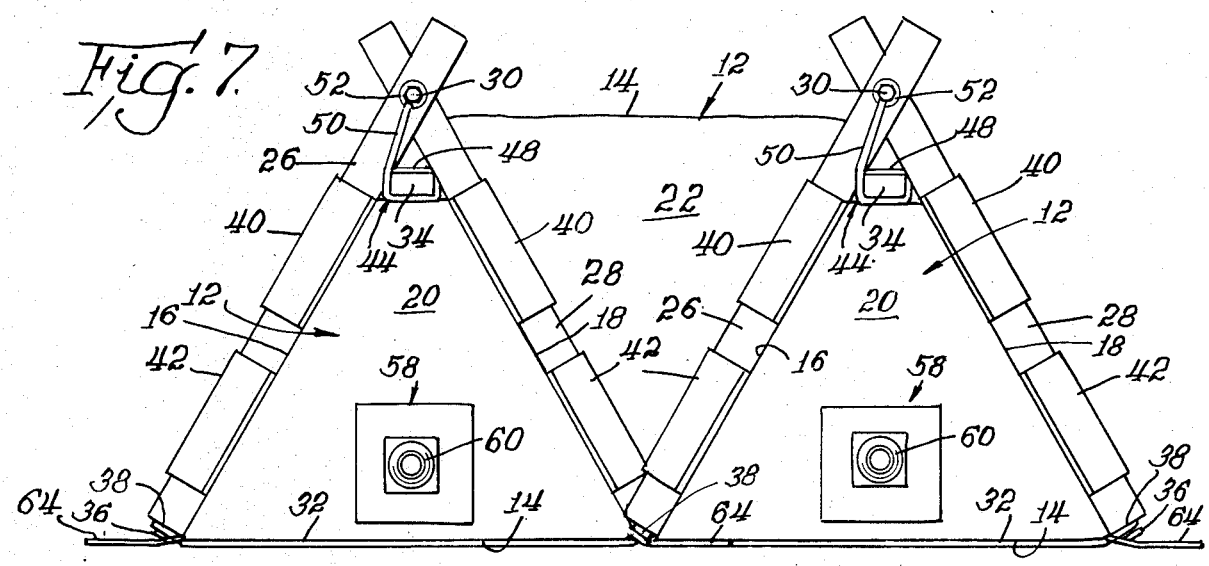

WATER-BAG DAM OR DIKE AND METHOD

BACKGROUND OF THE INVENTION

The invention relates to a water-bag dam or dike, to a closed-end tube of water-impervious material for use in making a dam or dike, and to a method for stemming flood waters.

FIELD OF THE INVENTION AND PRIOR ART

Floodwaters are commonly controlled by dams or dikes which are built of sandbags and the like. Sandbags, however, are heavy and cumbersome and when in place offer, at best, uncertain protection when the floodwaters become excessively violent. Sandbags, moreover, are dependent on a readily available source of sand, on means to transport the same, and manpower to fill the bags. One or the other or all of these, however, may not be available in an emergency.

It is an object of the invention to provide dam or dike elements which rely upon the most commonly available materials, such as water as a ballast, heavy duty plastic sheeting, and timbers, such as, two-by-fours, and the like for materials of construction.

SUMMARY OF THE INVENTION

The invention relates to a water-bag dam or dike which comprises:

a closed-end tube of water-impermeable, pliable sheeting having a bottom and side panels of substantially the same length and breadth connected to equilateral generally triangular end panels;

lateral support members in the form of an inverted V;

lateral-support-fastening means on said side panels attaching the same to lateral support members;

longitudinal support means located between said lateral support means adjacent the apex of the V;

longitudinal-support-fastening means at the apex of said lateral side panels attaching the same to said longitudinal support means;

water-inlet means for filling said water-bag with water whereby it is caused to assume a tubular shape having equilateral cross section; and water-outlet means whereby said tube can be drained.

The invention also is directed to a closed-end tube of water-impermeable, pliable sheeting comprising bottom and side panels of substantially the same length and breadth connected to equilateral generally triangular end panels; lateral-support-fastening means on said side panels for attaching the same to lateral support members; longitudinal-support-fastening means at the apex of said lateral side panels for attaching the same to longitudinal support means; water-inlet means through which said tube can be filled with water; and water-outlet means whereby said tube can be drained;

and to a method of providing a dam or dike for stemming floodwaters which comprises placing one dam or dike, or a series thereof laid end-to-end in parallel, juxtaposed position which dams or dikes are comprised of closed-end tubes of water-impermeable, pliable sheeting each of which has a bottom and side panels of substantially the same length and breadth connected to equilateral end panels; lateral support members in the form of an inverted V; lateral-support-fastening means on said side panels attaching the same to lateral support members; longitudinal support means located between said lateral support means adjacent the apex of the V;

longitudinal-support-fastening means at the apex of said lateral side panels attaching the same to said longitudinal support means;

water-inlet means for filling said water-bag with water whereby it is caused to assume a tubular shape having an equilateral cross section; water-outlet means whereby said tube can be drained;

and placing an additional said tube or tubes in inverted position in said channel and filling the same in situ with water.

The invention also comprises one or more features which further comprises longitudinally-extending flaps projecting from the junction of the bottom and side panels; in which said lateral-support-fastening means comprises pockets; in which each said lateral-support-fastening means comprises at least two pockets; in which said longitudinal-support-fastening means comprises tubular means affixed to the apex of said side panels; and in which said tubular means comprises a plurality of aligned tubes of a size and shape to receive said longitudinal support means.

BRIEF DESCRIPTION OF THE DRAWINGS

FIG. 1 is an isometric view of a unit according to the invention;

FIG. 2 is an isometric view of a closed-end tube of FIG. 1 without the supports but nonetheless substantially in the position the tube assumes when the supports are in place and is filled with water;

FIG. 3 is a detail view of a lateral support;

FIG. 4 is a detail view of the elements of the supporting structure;

FIGS. 5 and 6 are detail views of inlet or outlet means;

FIG. 7 is a schematic view showing how, when two units of the invention are lined up side by side in parallel alignment, a third unit can be insertd in the V between the first two units to form a broad-base assembly;

DESCRIPTION OF PREFERRED EMBODIMENTS

Figure 9:
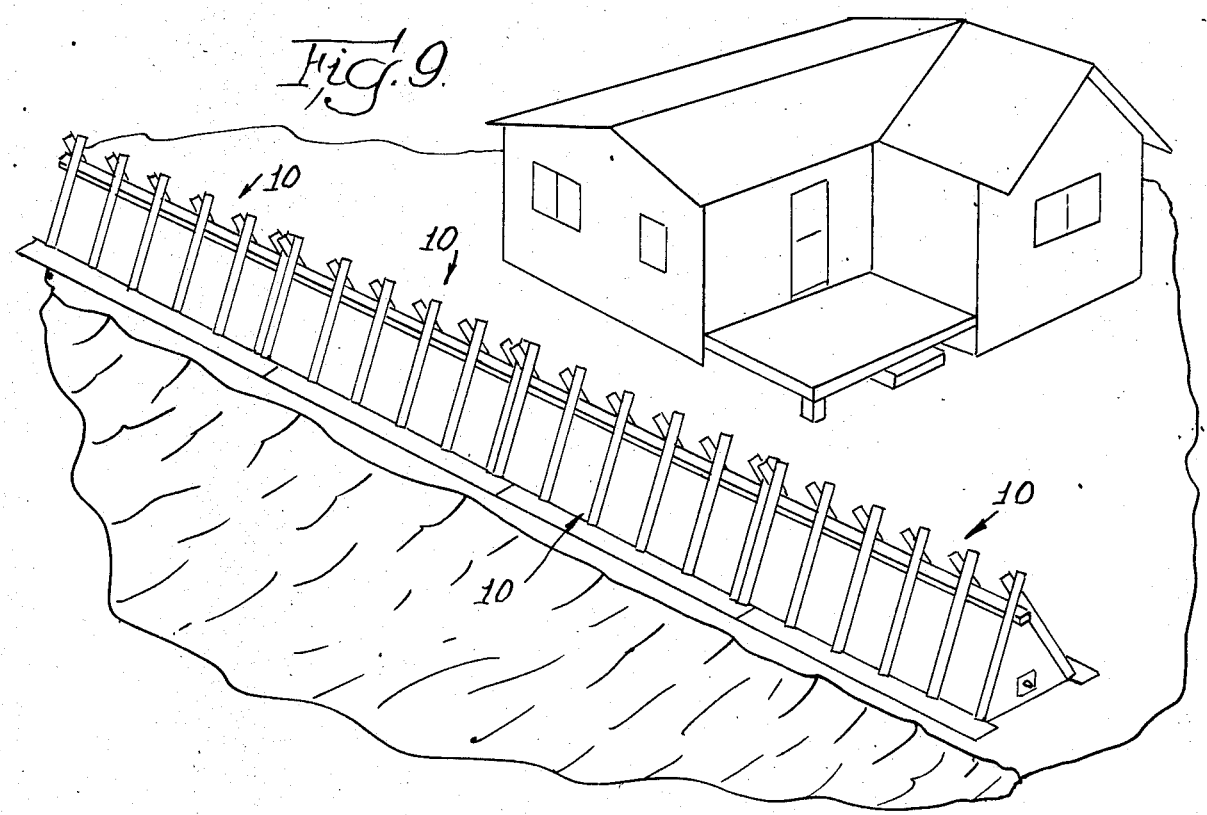
FIG. 9 is a pictorial representation showing how the dam or dike units of the invention are used to shore up a levee.

FIG. 9 gives a pictorial representation of a plurality of units according to the invention lined up end-to-end on a levee to form an elongate dam or dike such as can readily be erected whenever there is danger of floodwaters overflowing the levee.

Each unit 10 of the invention is comprised of a closed-end tube 12 made of durable, water-impervious, pliable sheeting having a bottom panel 14, side panels 16 and 18, and end panels 20 and 22. The end panels 20 and 22 have the shape of equilateral triangles so that, when the tube is filled with water and properly supported, it will have substantially an equilateral cross section.

The tube units 10 are supported by lateral support members 24 comprised of two rigid elongate members 26 and 28, suitably timbers, such as, two-by-fours, pivotally joined together adjacent one end, suitably by bolts 30. The opposite ends are connected with a flexible member 32, suitably a rope or chain, of a length such that when the members 26 and 28 are spead apart they form with each other an angle of approximately 60°, preferably sightly less in order to provide headspace for a longitudinal support member 34. The flexible member 32 and the support members 26 and 28 have complementary, detachable and attachable fasteners which suitably can be simply headed pins 36 and loops or washers 38 adapted to slip over the headed pins.

The side panels 16 and 18 have transverse support-fastening means comprised of pockets or sleeves which can be made up of two or more aligned segments 40 and 42. The lateral support elements 26 and 28 are threaded into these pockets or sleeves as shown in FIG. 1. The apex 44 formed at the juncture of the side panels 16 and 18 is provided with a longitudinal-support-fastening means 46 comprised of longitudinal pockets or sleeves which can be made up of a plurality of aligned pockets or sleeves 48. A longitudinal, rigid support member which, suitably, is a two-by-four or like timber, longer than the length of the unit, is threaded into pockets 48 in order to hold up the apex of the tube during filling and to keep the side panels from slouching down the lateral support members 16 and 18. The ends of the longitudinal support member 34 are fastened to the tops of the endmost lateral support members 24 by means of a flexible connector 50 which suitably is comprised of a wire or chain or like flexible member having loops or washers 52 at the ends thereof which can be fastened to the bolts 30 to form a sling 44 to hold up the longitudinal support member 34. These slings are provided at each end of each unit.

The tube unit 10 is provided with water-inlet means 56 which is located adjacent the apex of the tube and with water-outlet means 58 which is located adjacent the bottom of the tube. These can advantageously be simply flexible tubes 60, as shown in FIGS. 5 and 6, which are affixed to the walls of the tube by patches in a manner already well known in the art of making balloons and plastic balls. These can be tied or clamped off in any suitable manner to provide a completely water impervious tube.

The sleeves or pockets 40 and 42 can be made unitary with the sheeting of the side panels 16 and 18 by heat vulcanization, by cementing, or by any other suitable means. The sleeves or pockets 48 can be attached to the apex 44 of tube 12 in the same manner.

When the unit is assembled, water can be pumped in through the inlet means 56 to provide a massive unit that is effective in holding back floodwaters, but which requires transport to the situs of the flood, nothing more than the tube elements and a suitable water pump. The tube, being of flexible or pliable sheeting can be rolled up into a compact packsge for easy transport and the units assembled on the spot.

Advantageously, the junctures of the bottom panel with the side panels are provided with longitudinally-extending flaps or aprons 64 and are provided with openings 66 to accommodate the lateral support members 24, pins 36, washers 38, and cross stabilizers 32, as best seen in FIGS. 1 and 7. Thus, the side panels 16 and 18 are stretched out taut between the longitudinal support 34 and the bottoms of the lateral support members 24. These flaps or aprons also can be covered with ballast, if such is needed, more effectively to hold the unit in place while it is being filled, or otherwise, and to deter channeling under the bottom panel by the floodwaters and thus to minimize or to prevent undermining of the dam or dike.

Figure 8:
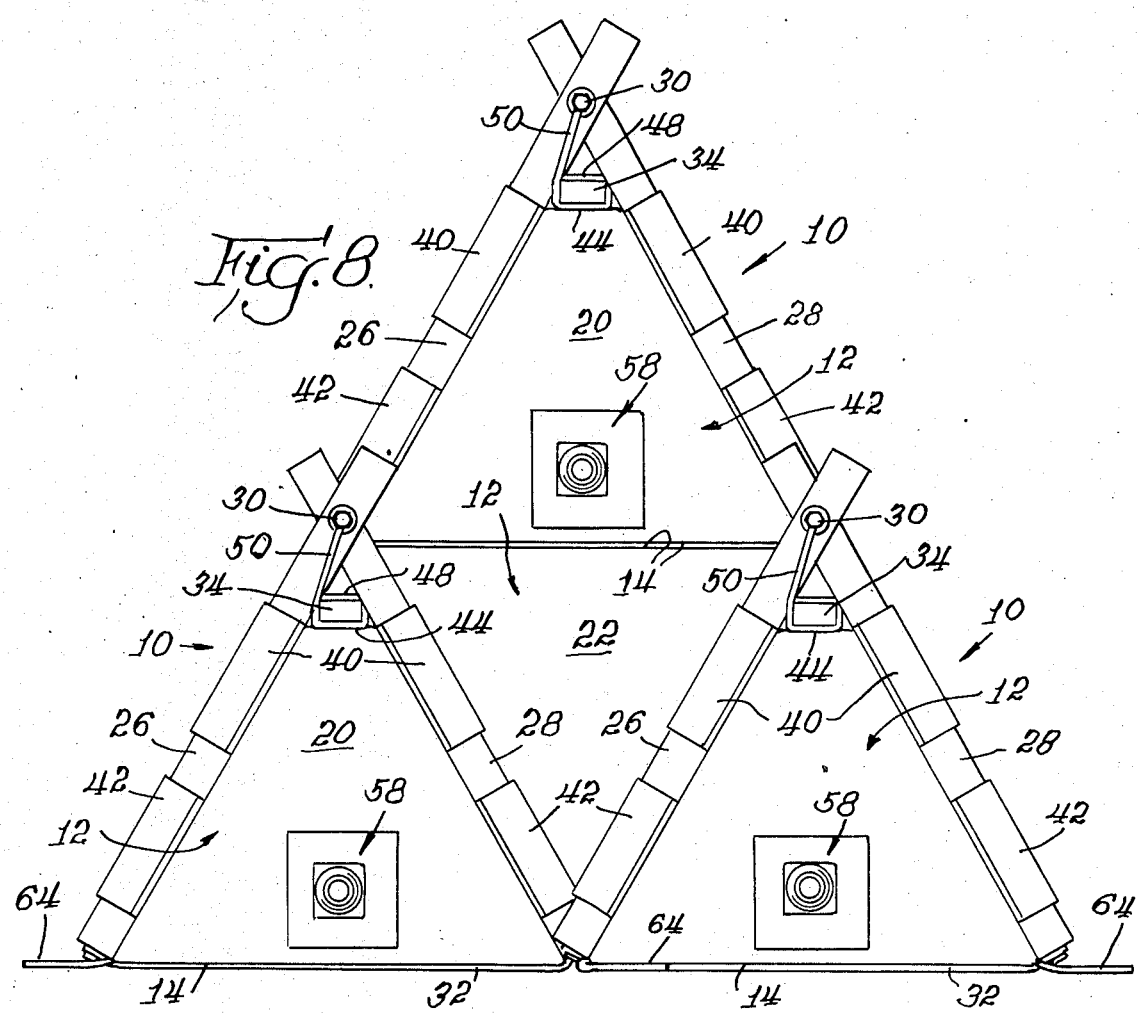
FIG. 8 is a schematic view showing how a fourth unit can be placed on the assembly of FIG. 7 to form a taller dam or dike.

As shown in FIGS. 7 and 8, a plurality of units can be arranged to form a broad-based dam or dike or one that is taller than a single unit. Thus, as seen in FIG. 7, the units can be arranged in side-by-side arrangement with one set of aligned units juxtaposed to another and parallel thereto. This provides a V-shaped trench between the two dams which can be occupied by an inverted tube series as shown in FIG. 7. As lateral support is provided by the parallel units, no lateral support members are required for the inverted units. Similarly, no longitudinal support member is required there.

When a broad-based dam or dike is built up, as in FIG. 7, a third unit can be added, as shown in FIG. 8. In this case, lateral and longitudinal support members are provided, as already described. However, it is sometimes of advantage to bolt these lateral support members to the tops of the lateral support members of the bottom tier, but, if desired, the outermost of the lateral support members can be unitary extensions of the corresponding lower tier lateral support members and can be bolted together over the apex of the topmost unit. In such case, the tie member 32 is extended to span the bottom panels of the bottom tier units.

It is to be understood, that inasmuch as the units are of plastic sheeting that is pliable and foldable, the bottom panel will follow the contour of the base to which the units are applied so that the possibility of channeling and undermining is further minimized. Also, it is to be understood that when the units are filled, the cross section will not be regular and that the panels will, to a limited extend, flex into any available space and the apex will be pressed down from a sharp point by the longitudinal support 34. It is for this reason that it is desirable that the angle formed by the lateral supports be somewhat less than 60°. It will also be understood that the side panels will bulge out between the lateral support members. It is desirable, therefore, that the lateral support members be spaced close together, say, not more than about two feet apart.

It is to be understood that the invention is not to be limited to the exact details of construction, operation, or exact materials or embodiments shown and described, as various modifications and equivalents will be apparent to one skilled in the art, and the invention is therefore to be limited only by the full scope of the appended claims.

I claim:
1. A water-bag dam or dike which comprises:
   a closed-end tube of water-impermeable, pliable sheeting having a bottom and two side panels of substantially the same length and breadth connected to equilateral generally triangular end panels;
   lateral support members in the form of an inverted V;
   lateral-support-fastening means on said side panels attaching the same to said lateral support members;
   longitudinal support means located between said lateral support members adjacent the apex of the V;
   longitudinal-support-fastening means at the apex of said side panels attaching the same to said longitudinal support means;
   water-inlet means for filling said water-bag with water whereby it is caused to assume a tubular shape having an equilateral cross section; and
   water-outlet means whereby said tube can be drained.
2. A water-bag dam or dike of claim 1 which further comprises longitudinally-extending flaps projecting from the junctions of the bottom and side panels.
3. A water-bag dam or dike of claim 1 in which said lateral-support-fastening means comprises pockets.

4. A water-bag dam or dike of claim 3 in which each said lateral-support-fastening means comprises at least two pockets per lateral support member.

5. A water-bag dam or dike of claim 1 in which said longitudinal-support-fastening means comprises tubular means affixed to the apex of said side panels.

6. A water-bag dam or dike of claim 5 in which said tubular means comprises a plurality of aligned tubes of a size and shape to receive said longitudinal support means.

7. A closed-end tube of water-impermeable, pliable sheeting comprising:
bottom and two side panels of substantially the same length and breadth connected to equilateral generally triangular end panels;
lateral-support-fastening means on said side panels;
longitudinal-support-fastening means at the apex of said side panels;
water-inlet means through which said tube can be filled with water; and
water-outlet means whereby said tube can be drained.

8. A closed-end tube of claim 7 which further comprises longitudinally-extending flaps projecting from the junctions of the bottom and side panels.

9. A closed-end tube of claim 7 in which said lateral-support-fastening means comprises pockets.

10. A closed-end tube of claim 9 in which each said lateral-support-fastening means comprises at least two pockets per lateral support member.

11. A closed-end tube of claim 7 in which said longitudinal-support-fastening means comprises tubular means affixed to the apex of said side panels.

12. A closed-end tube of claim 11 in which said tubular means comprises a plurality of aligned tubes.

13. A method for providing a dam or dike for stemming floodwaters which comprises placing one dam or dike, or a series thereof laid end-to-end, in parallel, juxtaposed position, said dams or dikes being comprised of:
closed-end tubes of water-impermeable, pliable sheeting each of which has a bottom and two side panels of substantially the same length and breadth connected to equilateral generally triangular end panels;
lateral support members in the form of an inverted V;
lateral-support-fastening means on said side panels attaching the same to lateral support members;
longitudinal support means located between said lateral support members adjacent the apex of the V;
longitudinal-support-fastening means at the apex of said lateral side panels attaching the same to said longitudinal support means;
water-inlet means for filling said water-bag with water whereby it is caused to assume a tubular shape having equilateral cross section;
water-outlet means whereby said tube can be drained;
filling said closed-end tubes with water, thereby forming a V-shaped, elongate channel between the parallel dams or dikes; and
placing additional said tube or tubes in inverted position in said channel and filling the same in situ with water.

14. A method of claim 13 which said dam or dike further comprises longitudinally-extending flaps projecting from the junction of the bottom and side panels.

15. A method of claim 13 in which said lateral-support-fastening means comprises pockets.

16. A method of claim 15 in which each said lateral-support-fastening means comprises at least two pockets per lateral support member.

17. A method of claim 13 in which said longitudinal-support-fastening means comprises tubular means affixed to the apex of said side panels.

18. A method of claim 17 in which said tubular means comprises a plurality of aligned tubes of a size and shape to receive said longitudinal support means.

* * * * *